(12) United States Patent
Pulli et al.

(10) Patent No.: US 9,824,427 B2
(45) Date of Patent: Nov. 21, 2017

(54) METHODS AND APPARATUS FOR GENERATING A SHARP IMAGE

(71) Applicant: THE LIGHTCO INC., Palo Alto, CA (US)

(72) Inventors: Kari Pulli, Palo Alto, CA (US); Nitesh Shroff, Palo Alto, CA (US); Sapna A. Shroff, Sunnyvale, CA (US); Rajiv Laroia, Far Hills, NJ (US)

(73) Assignee: Light Labs Inc., Palo Alto, CA (US)

( * ) Notice: Subject to any disclaimer, the term of this patent is extended or adjusted under 35 U.S.C. 154(b) by 257 days.

(21) Appl. No.: 14/689,689

(22) Filed: Apr. 17, 2015

(65) Prior Publication Data
US 2016/0309141 A1    Oct. 20, 2016

Related U.S. Application Data

(60) Provisional application No. 62/148,155, filed on Apr. 15, 2015.

(51) Int. Cl.
| | | |
|---|---|---|
| H04N 13/02 | (2006.01) | |
| G06T 5/00 | (2006.01) | |
| H04N 5/222 | (2006.01) | |
| H04N 5/225 | (2006.01) | |
| G06T 5/50 | (2006.01) | |

(52) U.S. Cl.
CPC ............... *G06T 5/003* (2013.01); *G06T 5/50* (2013.01); *H04N 5/2226* (2013.01); *H04N 5/2258* (2013.01); *G06T 2207/10016* (2013.01); *G06T 2207/10148* (2013.01); *H04N 13/0242* (2013.01)

(58) Field of Classification Search
CPC . G06T 2207/10016; G06T 2207/10148; G06T 5/003; G06T 5/50; H04N 13/0242; H04N 5/2226; H04N 5/2258
USPC .......................................................... 348/46
See application file for complete search history.

(56) References Cited

U.S. PATENT DOCUMENTS

| | | |
|---|---|---|
| 4,890,133 A | 12/1989 | Ogawa et al. |
| 5,078,479 A | 1/1992 | Vuilleumier |

(Continued)

FOREIGN PATENT DOCUMENTS

| | | |
|---|---|---|
| EP | 2642757 A2 | 9/2013 |
| JP | 10091765 | 4/1998 |

(Continued)

OTHER PUBLICATIONS

Cao et al, A Method for Identifying Image Data Coming from Two Optical Channels in a Split Field of View Star Camera, 2014.*

(Continued)

*Primary Examiner* — Shan Elahi
(74) *Attorney, Agent, or Firm* — Straub & Straub; Michael P. Straub; Stephen T. Straub

(57) ABSTRACT

Methods and apparatus for generating a sharp image are described. A camera device includes a plurality of camera modules, e.g., optical chains, where at least some of the camera modules have different depths of field. Multiple images of a scene are captured using the plurality of camera modules. Portions of the multiple images which correspond to the same scene area are identified. Image portion sharpness levels are determined for individual image portions. Image portions with high sharpness levels are selected and included in a composite image.

20 Claims, 11 Drawing Sheets

(56) References Cited

U.S. PATENT DOCUMENTS

| | | |
|---|---|---|
| 5,153,569 A | 10/1992 | Kawamura et al. |
| 5,353,068 A | 10/1994 | Moriwake |
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Ciurea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Mehta et al. |
| 8,780,258 B2 | 7/2014 | Lee |
| 8,896,655 B2 | 11/2014 | Mauchly et al. |
| 9,041,826 B2 | 5/2015 | Jung et al. |
| 9,104,705 B2 | 8/2015 | Fujinaga |
| 9,135,732 B2 | 9/2015 | Winn et al. |
| 9,282,228 B2 | 3/2016 | Laroia |
| 9,374,514 B2 | 6/2016 | Laroia |
| 2002/0149691 A1 | 10/2002 | Pereira et al. |
| 2003/0018427 A1 | 1/2003 | Yakota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavely et al. |
| 2005/0088546 A1 | 4/2005 | Wang |
| 2005/0200012 A1 | 9/2005 | Kinsman |
| 2006/0067672 A1 | 3/2006 | Washisu et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2006/0281453 A1 | 12/2006 | Jaiswal et al. |
| 2007/0046776 A1* | 3/2007 | Yamaguchi ........ H04N 13/0059 348/53 |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0167923 A1* | 7/2009 | Safaee-Rad ........ H04N 5/23212 348/345 |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0214437 A1* | 8/2010 | Kim ..................... H04N 5/21 348/223.1 |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0283842 A1 | 11/2010 | Guissin et al. |
| 2010/0296802 A1 | 11/2010 | Davies |
| 2011/0025830 A1* | 2/2011 | McNamer ............ H04N 13/021 348/50 |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0019711 A1* | 1/2012 | Ng ..................... G02B 3/0056 348/350 |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0207462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0041221 A1* | 2/2013 | McDowall et al. .................. A61B 1/00096 600/111 |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2013/0329013 A1* | 12/2013 | Metois ............... H04N 13/0203 348/46 |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |

(56) References Cited

U.S. PATENT DOCUMENTS

| | | |
|---|---|---|
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1 | 10/2014 | Milanfar et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Hsu et al, Depth Map Building Based on Pixel No. Variation and Surf, Oct. 5-9, 2014.*

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures", 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

International Search Report and Written Opinion of the International Searching Authority from International No. Application PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

* cited by examiner

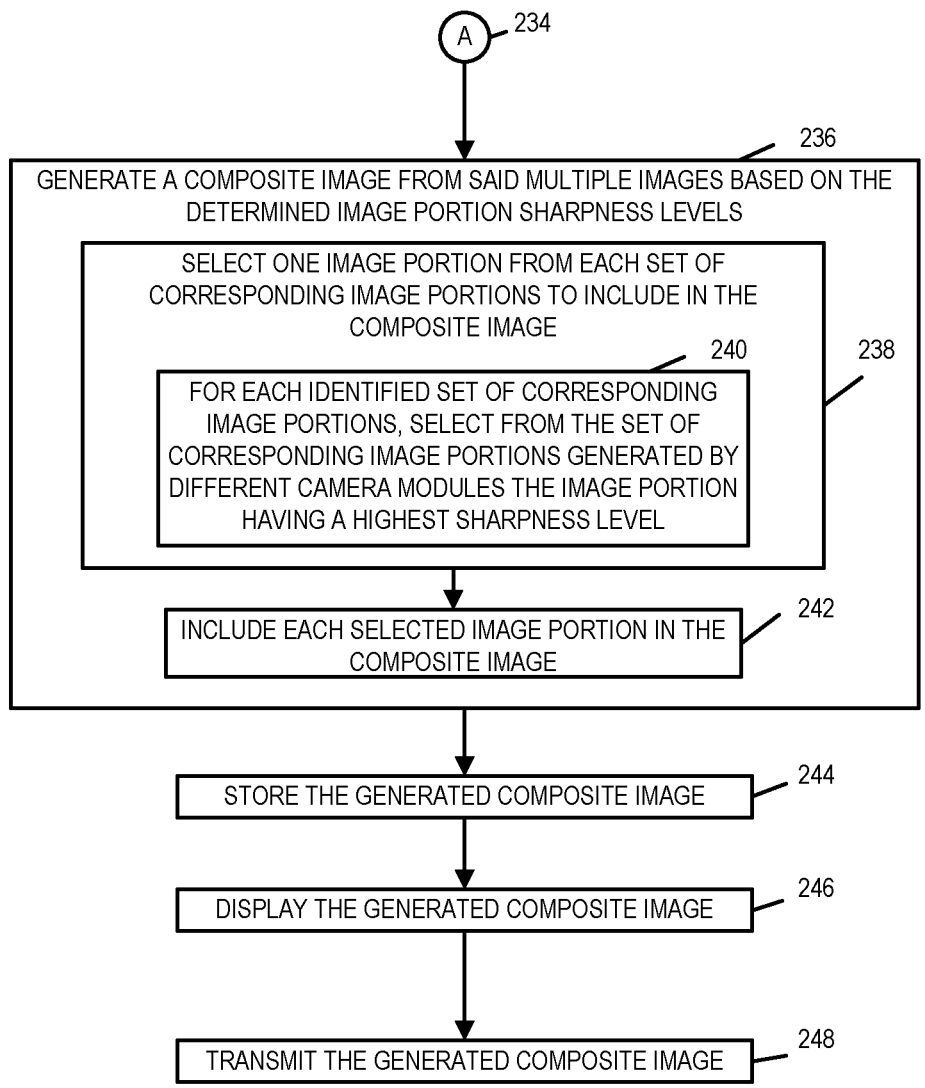

DETERMINED SHARPNESS LEVEL VALUES
FIGURE 7

COMPOSITE IMAGE OF SELECTED SHARPEST PORTIONS

METHODS AND APPARATUS FOR GENERATING A SHARP IMAGE

RELATED APPLICATIONS

The present application claims the benefit of U.S. Provisional Patent Application Ser. No. 62/148,155 filed Apr. 15, 2015 which is hereby expressly incorporated by reference in its entirety.

FIELD

The present application relates to generating an image and more particularly, to methods and/or apparatus for generating a sharp image based on combining captured image portions from camera modules having different depths of field.

BACKGROUND

A scene area desired to be captured typically includes objects at different distances in different portions of the scene. A camera with a single optical chain can set its focus to achieve a sharp image at a particular selected distance. Unfortunately, objects which are not close to the selected distance may be blurry.

It would be advantages if methods and apparatus were developed which would allow objects at different distance from a camera to be sharp in an image generated from a plurality of images captured by a camera.

SUMMARY

A plurality of camera modules, at least some of said camera modules having different depths of field, are used in parallel to capture images of a scene area resulting in a set of images for a scene taken by different modules. In various embodiments, at least some of the camera modules, having different depths of field, have different focal lengths, have the same focal length but different apertures, or have the same focal length and the same aperture but different sensor pixel sizes, where the sensor pixel size is the area used by a sensor to detect one pixel.

The methods and apparatus take advantage of the fact that different camera modules may capture images with some image portions being sharper in the image captured by one camera than the image captured by another camera module due to any of many different reasons. One possible reason for a difference in image sharpness may be that a camera module, e.g., a camera modules with a 150 mm focal length, with a larger aperture and narrower field of view, may be able to focus to a surface better than another camera modules with a narrower aperture and a larger field of view such as may be the case with a 35 mm camera module. While a module such as the 150 mm camera module may produce images with objects at one distance from the camera which are sharp, the 35 mm module may provide sharper image portions for surfaces at other distances, e.g., further away from or closer to the camera than where the 150 mm focal length module produce a sharp image. Other reasons for differences in sharpness between cameras may include that the cameras are focused differently.

In some but not necessarily all embodiments information about the optical characteristics of the individual camera modules is used to determine a sharpness level that will be achieved for the particular individual camera module for a given object depth. In one particular exemplary embodiment depth information with regard to objects in different portions of one or more images is first determined via triangulation and/or through the use of stereo information available from the capture of multiple images of the same objects using different camera modules, e.g., having a known physical relationship to each other. In at least some such embodiments, based on the knowledge of optical characteristics of the camera modules, such as the lenses and their focus settings, a determination is made as to which camera modules will have the sharpest pixels for a given object depth without having to do any frequency analysis on the captured image to determine sharpness. In such a case sharpness can be determined from determining the depth to which the image portion corresponds, e.g., based on the object(s) in the image portion, and the known camera information.

Images captured in parallel are analyzed to identify sharp image portions. In some embodiments, a sharpness level for an individual image portion corresponding to one captured image is determined based on the depth to which the image portion corresponds, e.g., based on a depth map, and the camera module to which the image portion corresponds. In other embodiments frequency analysis is applied to the captured image and a sharpness level is assigned based on the frequency content of the image portion.

Content from different images is then combined into a single composite image with the sharpest image portions being selected to be included in the composite image. A selected sharpest image portions may be, and sometimes is, of lower pixel resolution than a corresponding image portion captured by another camera module, which may have a higher pixel resolution but the image still appears more blurred. While the image content of the composite image may be generated from sharp but lower-resolution image portions for some image portions, the resulting overall image quality tends to be better given that the selected lower-resolution portions included in the composite image were sharp and the higher-resolution image portion corresponding to the same image area, which was not included in the composite image and was blurry. The resulting image will, in some embodiments, be a composite image with different portions captured at different resolutions but with all or most of the image portions being in focus providing an image with better overall quality than might be achieved using a single image captured using a camera module of the highest supported resolution but with out of focus image portions being included in the output image.

In some embodiments the user is provided the option of selecting an "auto sharpen" mode of operation in which the composite image will be generated automatically based on the sharpness analysis while in a "normal" mode of operation the composite image generation is performed to maximize some other image characteristic. A user may provide input on the image sharpening operation and may select portions of the image rather than the entire image to be subject to the sharpening operation.

An exemplary method of generating an image, in accordance with some embodiments, includes: capturing multiple images of a scene using camera modules, at least some of said camera modules having different depths of field; determining an image portion sharpness level for each of a plurality of portions of said multiple images; and generating a composite image from said multiple images based on the determined image portion sharpness levels. An exemplary camera device, in accordance with some embodiments, includes: a plurality of camera modules, at least some of said camera modules having different depths of field; an image capture control module configured to control said plurality of camera modules to capture multiple images of a scene; a sharpness level determination module configured to determine an image portion sharpness level for each of a plurality of portions of said multiple images; and a composite image generation module configured to generate a composite image from said multiple images based on the determined image portion sharpness levels.

While many embodiments and features have been discussed in the above summary, it should be appreciated that many of the novel features described herein can be used independent of other novel features. Thus while various exemplary embodiments have been described, the application is not limited to the particular exemplary embodiments or combinations of features described in particular exemplary embodiments.

Numerous additional features and embodiments are described in the detailed description which follows.

BRIEF DESCRIPTION OF THE DRAWINGS

FIG. 2B is a second part of a flowchart of an exemplary method of generating an image in accordance with an exemplary embodiment.

FIG. 2 comprises the combination of FIG. 2A and FIG. 2B.

FIG. 7 illustrates exemplary determined sharpness level values corresponding to the example of FIG. 6 in accordance with an exemplary embodiment.

DETAILED DESCRIPTION

Figure 1:
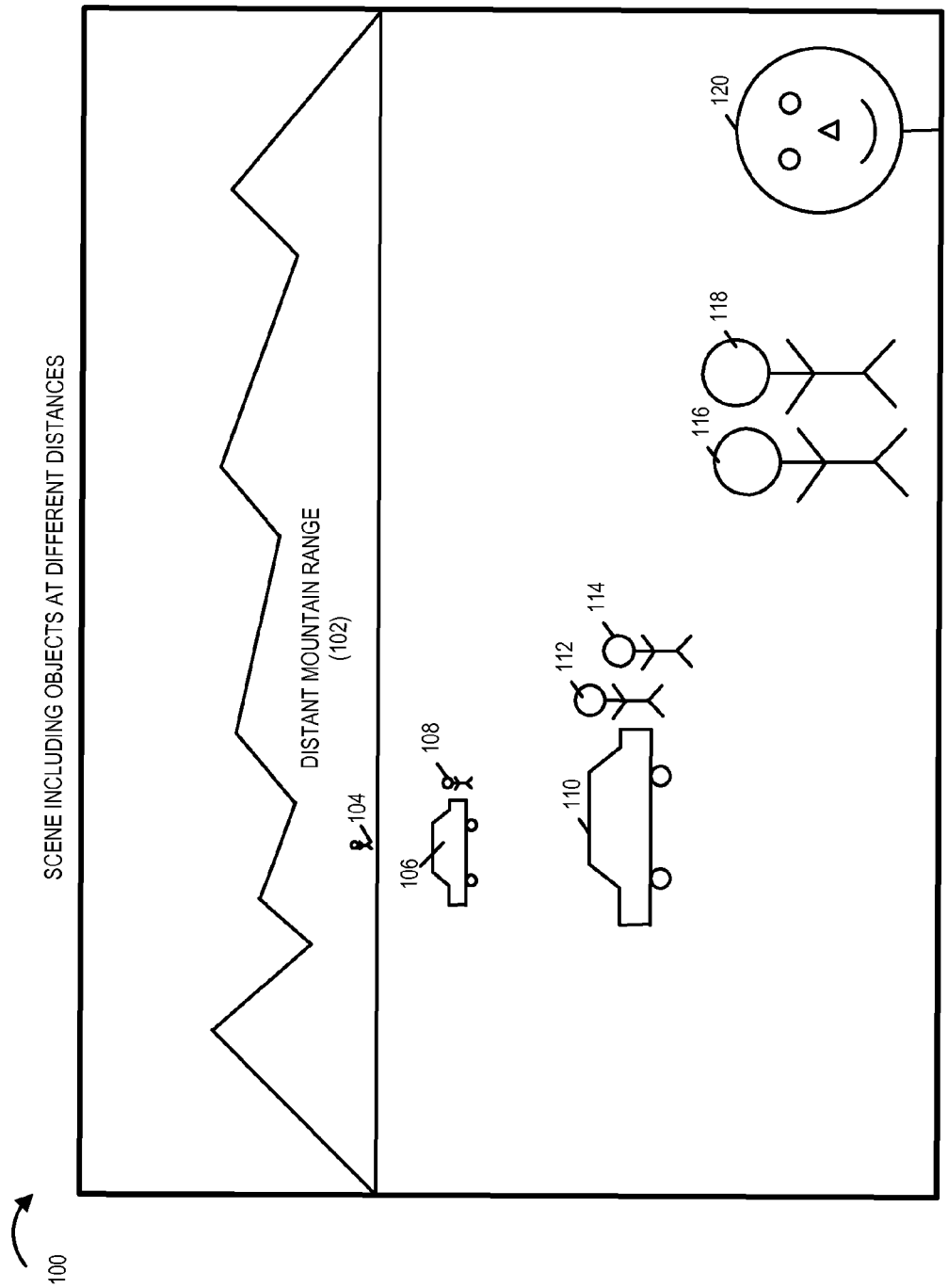
FIG. 1 is a drawing showing an exemplary scene area including objects at different distances.

FIG. 1 is an illustration 100 of an exemplary scene area showing objects at different distances from a camera device. Exemplary objects include a very distant mountain range 102, a first person 104 at the base on the mountain range, a first car 106 and a second person 108 in the far distance, a second car 110, a third person 112, and a fourth person 114 at medium distance, a fifth person 116 and a sixth person 118 at a near distance, and a head 120 of a seventh person at a very close distance with respect to the camera. A camera device, implementing a method in accordance with the present invention generates an overall sharp composite image by combining sharp image portions from images captured by a plurality of camera modules, e.g., optical chains, included in the camera device, at least some of said plurality of camera modules having different depths of field.

Figure 2A:
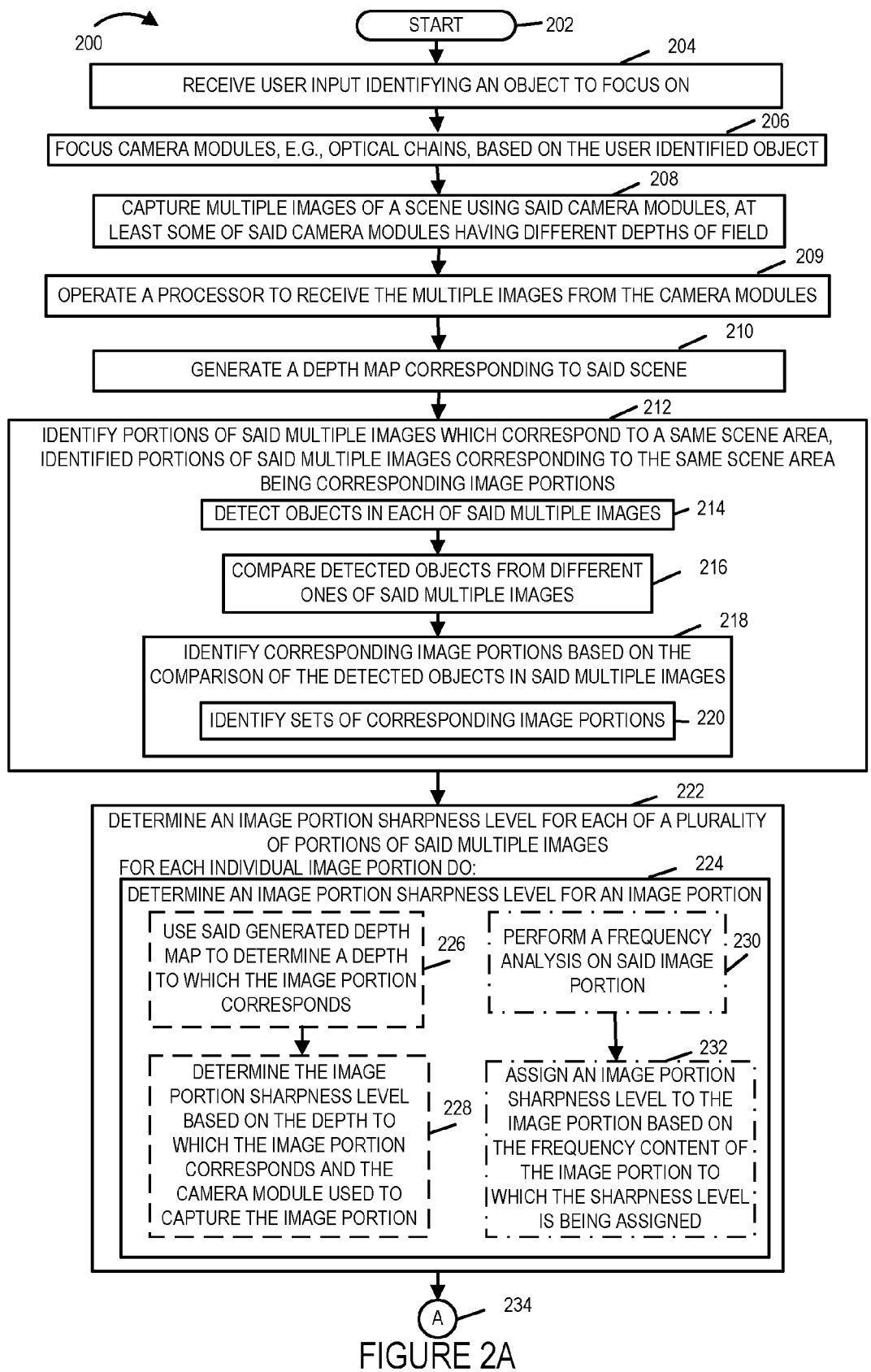
FIG. 2A is a first part of a flowchart of an exemplary method of generating an image in accordance with an exemplary embodiment.
Figure 10:
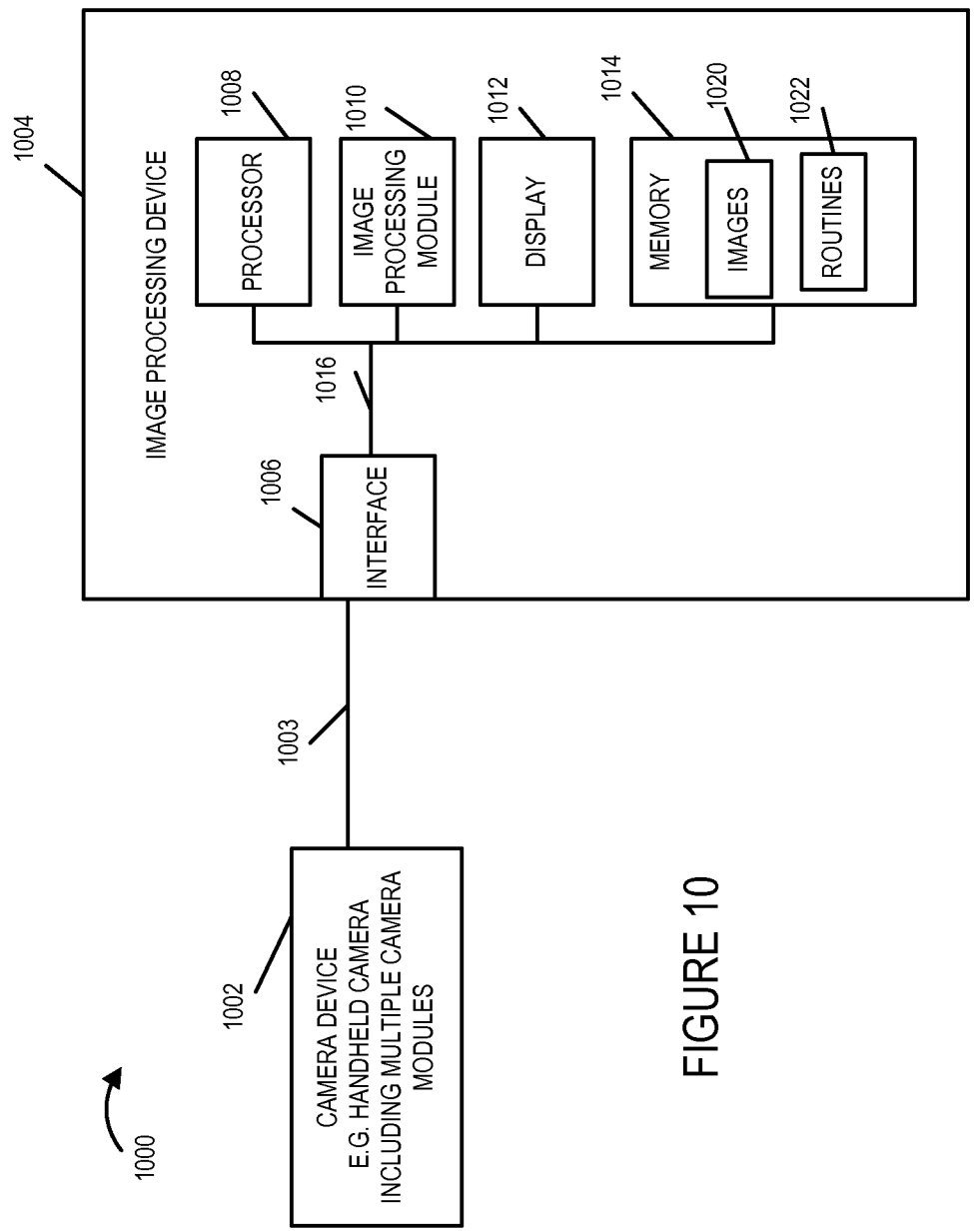
FIG. 10 illustrates a camera system including a camera device and an image processing device which can be used in accordance with the present invention.

FIG. 2, comprising the combination of FIG. 2A and FIG. 2B, is a flowchart 200 of an exemplary method of generating an image in accordance with an exemplary embodiment that is implemented by a camera system. The camera system maybe a camera device such as the one shown in FIG. 3 or a combination of a camera device and an external processing device such as a computer system as shown in FIG. 10. As will be discussed below, in the FIG. 10 embodiment the processing device which maybe, e.g., a personal computer or network based image processing device, can receive images from a camera device and processes the images to generate a composite image in accordance with the invention.

The exemplary method of flowchart 200 may be, and in various embodiments is, performed by a camera device including camera modules, and at least some of the camera modules have different focal length, have the same focal length but different apertures, or have the same focal length, same aperture and different sensor pixel sizes, where the sensor pixel size is the area used by a sensor to detect 1 pixel. These various combinations cause different camera modules to have different depths of field. The method 200 maybe, and in some embodiments is, implemented by the exemplary camera device 300 shown in FIG. 3 and will be explained using as an example the case where the camera device 300 performs the steps shown in FIG. 2. It should be appreciated that, as noted above, the invention is not limited to an embodiment implemented fully in a camera device and that in some embodiments some or all of the image processing may be performed in an image processing device coupled to the camera device. In some embodiments the camera device 300 is a handheld camera.

Operation starts in step 202 in which the camera device and, optionally the corresponding image processing device in the case of the FIG. 10 example, is powered on and initialized. Operation proceeds from step 202 to step 204.

In step 204, the camera device receives user input identifying an object to focus on, e.g., user input indicates a touch of a touch screen displaying an image of a scene, the touch identifying an object in the scene. Operation proceeds from step 204 to step 206. In step 206 the camera device focuses camera modules, e.g., optical chains, based on the user identified object. While, the object the user selected for focusing the camera modules is the same, some camera modules may have more limited focus adjustment than other camera modules, and thus when the object is beyond the maximum focus distance of a module the module will be set to its maximum focus distance. In some embodiments, a plurality of camera modules with different depths of field may be, and sometimes are, set to focus at the same distance, e.g., in the case where the selected object to be focused on is within the focus range of multiple modules with different depth of fields. Operation proceeds from step 206 to step 208.

In step 208 the camera device captures multiple images of a scene using camera modules, e.g., optical chains. In various embodiments, the multiple images are captured in parallel. Operation proceeds from step 208 to step 209 in which a processor receives the multiple images captured in step 208 for processing. In the case where all processing is performed in the camera device 300, step 209 maybe performed by the processor 308. In the case where an image processing device is used to processes captured images step 209 maybe performed by the processor 1008 which will be used to process captured image and to generate a composite image therefrom. Generation of the depth map and/or other processing may be performed by either the processor of the camera device 308 or image processing device 1004 which is used in some but not all embodiments.

Operation proceeds from receive step 2009 to depth map generation step 210. In step 210 the camera device generates a depth map corresponding to said scene. In some embodiments, generating a depth map includes processing images from different camera modules using triangulation techniques and/or processing stereo images to extract depth information. The depth map may assign objects of a captured scene to different depths with the number of possible depths depending on the particular implementation. In some cases the depth map may be represented as a grayscale image of the scene with each pixel value in the depth map corresponding to one of a possible number of different distances from the camera. The depth map information can, and in various embodiments is, used for subsequent image processing. The number of different depths in the depth map maybe limited to a predetermined number with each object, e.g., pixel or area corresponding to an object, in a scene being assigned to the depth to which it corresponds.

Operation proceeds from step 210 to step 212. In step 212 the camera device identifies portions of said multiple images which correspond to a same scene area, identified portions of the said multiple images corresponding to the same scene area being corresponding image portions. Step 212 includes steps 214, 216 and 218. In step 214 the camera device detects objects in each of said multiple images. Operation proceeds from step 214 to step 216. In step 216 the camera device compares detected objects from different ones of said multiple images. Operation proceeds from step 216 to step 218. In step 218 the camera device identifies image portions based on the comparison of the detected objects in said multiple images. Step 218 includes step 220 in which the camera device identifies sets of corresponding image portions.

Operation proceeds from step 212 to step 222. In step 222 the camera device analyzes the image to determine an image portion sharpness level for each of a plurality of portions of said multiple images. Step 222 includes step 224, which is performed for each individual image portion of the identified sets of corresponding image portions. In step 224 the camera device determines an image portion sharpness level for an image portion. In some embodiments, step 224 includes optional steps 226 and 228. In some embodiments, step 224 includes optional steps 230 and 232.

In step 226, the camera device uses the generated depth map to determine a depth to which the image portion corresponds. Operation proceeds from step 226 to step 228 in which the camera device determines the image portion sharpness level based on the depth to which the image portion corresponds and the camera module used to capture the image portion. In some embodiments, at least some of the camera modules have different optical characteristics and different depths of field. In some embodiments, determining an image portion sharpness level for an image portion is based on an optical transfer function of the camera module which captured the image portion. In various embodiments, the optical characteristics of the camera module is a function of at least one of: a depth of field setting, the focus distance, the focal length of the camera modules, and the distance from the camera to objects in said image portion as indicated based on the depth map. In some embodiments, module 228 determines a sharpness level for an image portion corresponding to a camera module based on depth information corresponding to the image portion, and knowledge of the lenses and their focus setting in the camera module.

In step 230 the camera device performs a frequency analysis on the individual image portion. Operation proceeds from step 230 to step 232, in which the camera device assigns a sharpness level to the individual image portion based on the frequency content of the image portion to which the sharpness level is being assigned.

Operation proceeds from step 222, via connecting node A 234, to step 236.

In step 236 the camera device generates a composite image from said multiple images based on the determined image portion sharpness levels. Step 236 includes step 238 and step 242. In step 238 the camera device selects one image portion from each set of corresponding image portions to include in the composite image. Step 238 includes step 240. In step 240, for each identified set of corresponding image portions, the camera device selects, from the set of set of corresponding image portions generated by different camera modules, the image portion having the a highest sharpness level. In some embodiments, at least some of the image portions in a set of corresponding image portions are captured at different resolutions, and the selecting is performed without regard to the resolution of the image portion in said set of corresponding image portions.

In various embodiments, the image portions of the composite image are non-overlapping. Operation proceeds from step 238 to step 242, in which the camera device includes each selected image portion in the composite image.

Operation proceeds from step 236 to step 244, in which the camera device stores the generated composite image, e.g., in memory of the camera device. Operation proceeds from step 244 to step 246 in which the camera device displays the generated composite image, e.g., on a display screen of the camera device. Operation proceeds from step 246 to step 248, in which the camera device transmits the generated composite image, e.g., via a wired and/or wireless interface, to one or more other devices.

Figure 3:
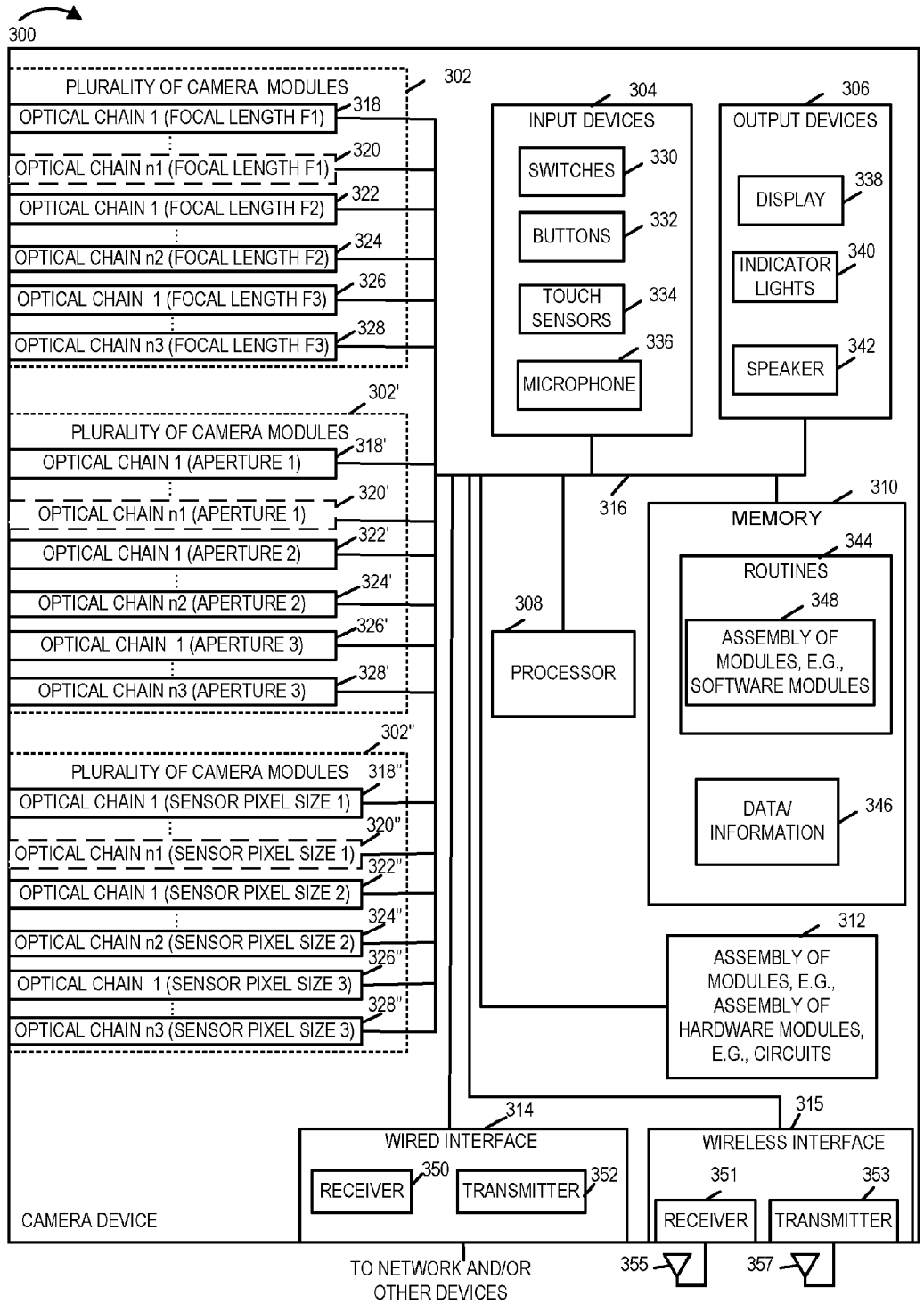
FIG. 3 illustrates a camera device implemented in accordance with one embodiment of the present invention.

FIG. 3 is a drawing of an exemplary camera device 300 in accordance with an exemplary embodiment. In various embodiments, camera device 300 is a portable handheld device. Exemplary camera device 300 includes a plurality of camera modules, e.g., optical chain modules, at least some of the plurality of camera modules having different depth of field. Each camera module, e.g., optical chain, includes an aperture, one or more lenses, focusing control elements, e.g., for moving a lens or mirror, and a image sensor. In some embodiments, the apertures are fixed. The camera modules capture images, e.g., multiple images in parallel corresponding to a scene, e.g., one image per camera module corresponding to the same scene. Some of the camera modules may capture the entire scene area other camera modules may capture a portion of the scene area. In some embodiments, the plurality of camera modules includes 35 mm camera modules, 75 mm camera modules and 150 mm camera modules. In various embodiments, exemplary camera device 300 includes one or more of: plurality of camera modules 302, plurality of camera modules 302' and plurality of camera module 302". Plurality of camera modules 302 includes: one or more optical chains with focal length F1 (optical chain 1 with focal length F1 318, . . . , optical chain n1 with focal length F1 320), a plurality of optical chains with focal length F2 (optical chain 1 with focal length F2 322, . . . , optical chain n2 with focal length F2 324), and a plurality of optical chains with focal length F3 (optical chain 1 with focal length F3 326, . . . , optical chain n3 with focal length F3 328), where focal length F1, focal length F2, and focal length F3 are different values. Plurality of camera modules 302' includes: one or more optical chains with aperture 1 (optical chain 1 with aperture 1 318', . . . , optical chain n1 with aperture 1 320'), a plurality of optical chains with focal aperture 2 (optical chain 1 with aperture 2 322', . . . , optical chain n2 with aperture 2 324'), and a plurality of optical chains with aperture 3 (optical chain 1 with aperture 3 326', . . . , optical chain n3 with aperture 3 328'), where aperture 1, aperture 2, and aperture 3 are different size apertures. Plurality of camera modules 302" includes: one or more optical chains with sensor pixel size 1 (optical chain 1 with sensor pixel size 1 318", . . . , optical chain n1 with sensor pixel size 1 320"), a plurality of optical chains with sensor pixel size 2 (optical chain 1 with sensor pixel size 2 322", . . . , optical chain n2 with sensor pixel size 2 324"), and a plurality of optical chains with sensor pixel size 3 (optical chain 1 with sensor pixel size 3 326", . . . , optical chain n3 with sensor pixel size 3 328"), where sensor pixel size 1, sensor pixel size 2, and sensor pixel size 3 are different. One exemplary sensor pixel size is 1.4 micron, e.g., which is a characteristic of one exemplary 8 megapixel sensor. Another exemplary sensor pixel size is 1.1 micron, which is a characteristic of one exemplary 14 megapixel sensor.

Camera device 300 further includes input devices 304, output devices 306, a processor 308, e.g., a CPU, memory 310, assembly of modules 312, e.g., an assembly oh hardware modules such as an assembly of circuits, a wired interface 314, and a wireless interface 315. Input devices 304 include switches 330, buttons 332, touch sensor 334, and a microphone 336. Received input via an input device includes input indicating a user selection of an object on which to focus camera modules. Output devices 306 include a display 338, indicator lights 340, and a speaker 342. In some embodiments, the display 338 is a touch screen display which serves as both an output device for displaying an image and an input device for receiving input. Memory 310 includes routines 344 and data/information 346. Routines 344 include an assembly of modules 348, e.g., an assembly of software modules. Data/information 346 includes, stored captured images from the camera modules, information identifying detected objects, information used to align multiple images, generated composite images, user selected information, camera module characteristic information, image portion frequency analysis information, depth map information, information identifying sets of corresponding image portions corresponding to multiple camera modules, determined image portion sharpness levels for individual image portions, determined maximum sharpness level for sets of corresponding image portions, information identifying the image portion corresponding to the determined maximum sharpness level for each of a plurality of sets of corresponding image portions.

Wired interface 314 includes a receiver 350 and a transmitter 352, e.g., for communicating with other devices, e.g., via a network and/or the Internet. In some embodiments, generated composite images are communicated to other devices via wired interface 314. Wireless interface 315 includes a wireless receiver 351 coupled to receive antenna 355 and a wireless transmitter 352 coupled to transmit antenna 357, e.g., for communicating with other devices including a wireless interface. In some embodiments, generated composite images are communicated to other devices via wireless interface 315.

Optical chains in plurality of camera modules (302, 302', 302"), input devices 304, output devices 306, processor 308, memory 310, assembly of modules 212, wired interface 314 and wireless interface 314 are coupled together via a bus 316 over which the various elements may interchange data and information.

Figure 4:
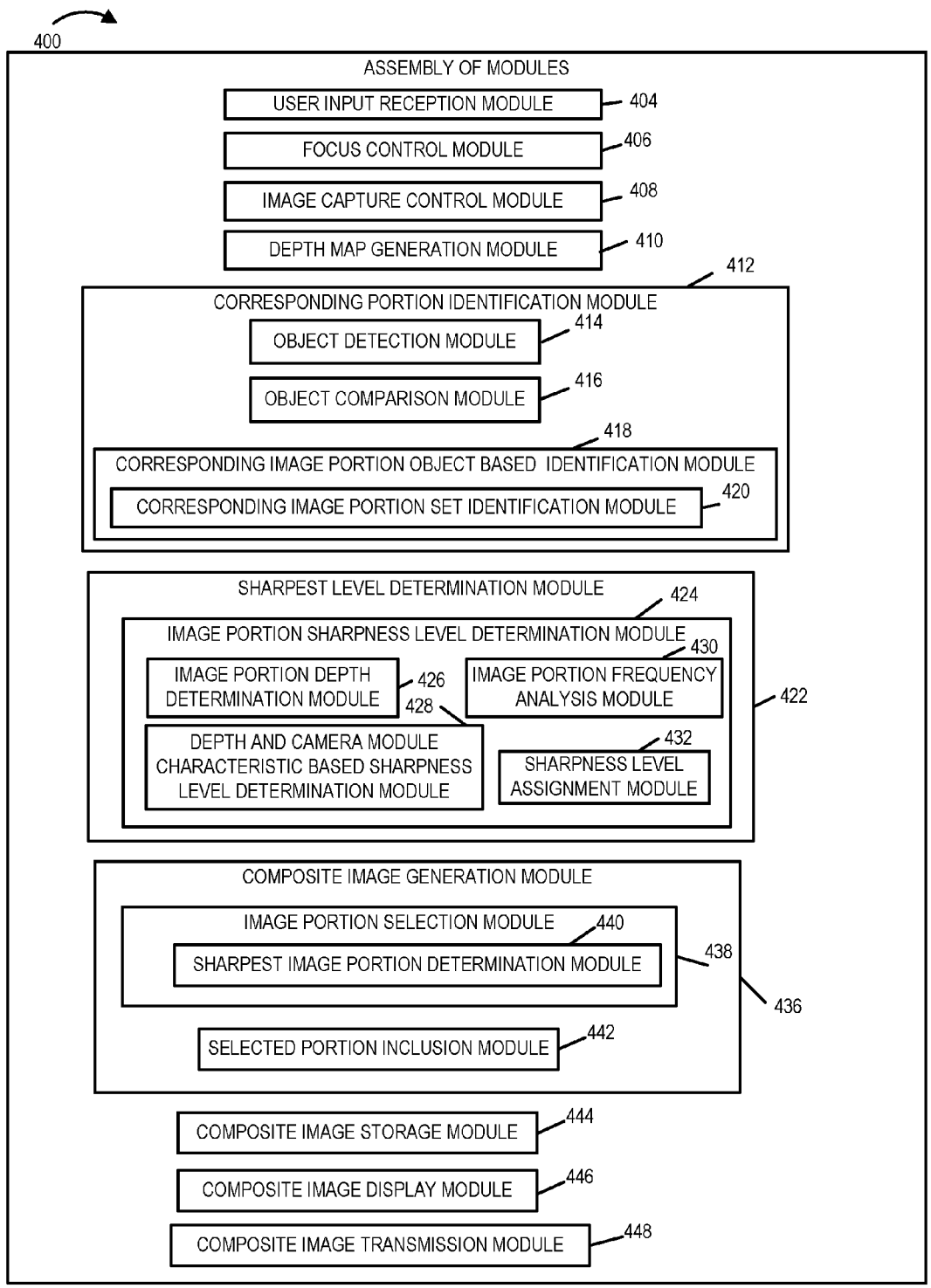
FIG. 4 is an assembly of modules, which may be included in a camera device, in accordance with an exemplary embodiment.

FIG. 4 is a drawing of an assembly of modules 400, which may be included in a camera device implemented in accordance with the present invention, e.g., camera device 300 of FIG. 3. Assembly of modules 400 may implement steps of a method, e.g., steps of the method of flowchart 200 of FIG. 2. In some embodiments, assembly of modules 400 is an assembly of circuits, which may be coupled together. In one exemplary embodiment, assembly of modules 400 is assembly of modules 312 of camera 300 of FIG. 3. In some embodiments, the assembly of module 400 is an assembly of software modules. In one exemplary embodiment, assembly of modules 400 is assembly of modules 348 of memory 310 of camera 300 of FIG. 3. The modules in the assembly of modules 400 can, and in some embodiments are, implemented fully in hardware within the processor 308, e.g., as individual circuits. The modules in the assembly of modules 400 can, and in some embodiments are, implemented fully in hardware within the assembly of modules 312, e.g., as individual circuits corresponding to the different modules. In other embodiments some of the modules are implemented, e.g., as circuits, within the processor 308 with other modules being implemented, e.g., as circuits within assembly of modules 312, external to and coupled to the processor. As should be appreciated the level of integration of modules on the processor and/or with some modules being external to the processor may be one of design choice.

Alternatively, rather than being implemented as circuits, all or some of the modules in assembly of modules 400 may be implemented in software and stored in the memory 310 of the camera device 300, with the modules controlling operation of camera device 300 to implement the functions corresponding to the modules when the modules are executed by a processor, e.g., processor 308. In some such embodiments, the assembly of modules 400 is included in the memory 310 as assembly of modules 348. In still other embodiments, various modules in assembly of modules 400 are implemented as a combination of hardware and software, e.g., with another circuit external to the processor providing input to the processor 308 which then under software control operates to perform a portion of a module's function. While shown in the FIG. 3 embodiment as a single processor, e.g., computer, it should be appreciated that the processor 308 may be implemented as one or more processors, e.g., computers.

When implemented in software the modules include code, which when executed by the processor 308, configure the processor 308 to implement the function corresponding to the module. In embodiments where the assembly of modules 400 is stored in the memory 310, the memory 310 is a computer program product comprising a computer readable medium comprising code, e.g., individual code for each module, for causing at least one computer, e.g., processor 308, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the camera device 300 elements therein such as the processor 308, to perform functions of the corresponding steps illustrated in the method flowchart 200 of FIG. 2. Thus the assembly of modules 400 includes various modules that perform functions of the corresponding steps of the method shown in FIG. 2.

Assembly of modules 400 includes a user input reception module 404, a focus control module 406, an image capture control module 408, and a depth map generation module 410. Assembly of modules 400 further includes a corresponding portion identification module 412, a sharpest level determination module 422, a composite image generation module 436, a composite image storage module 444, a composite image display module 446 and a composite image transmission module 448. User input reception module 404 is configured to receive user input identifying an object to focus on, e.g., receive user input indicating a touch on a touch screen display an image. Focus control module 406 is configured to control camera modules of the camera device to focus based on a user-identified object, e.g. based on information from user input reception module 402. In some embodiments, while the object the user selected for focusing the camera is the same, some camera modules may have more limited focus adjustment than other modules and then when the selected object is beyond the maximum focus distance of a module the module will be set to its maximum distance. In various embodiments, a plurality of camera modules with different depths of field can be, and sometimes are, set to focus to the same distance. For example, this scenario is the case where the object selected to be focused on is with the focus range of multiple camera modules, e.g., optical chains, with different depths of field.

Image capture control module 408 is configured to control a plurality of camera modules, e.g., optical chains, to capture multiple images of a scene, at least some of said camera modules having different depths of field. In some embodiments, at least some of the camera modules being controlled by image capture control module 408 have different focal lengths, have the same focal length but different apertures, or have the same focal length, same aperture and different pixel sensor sizes. In various embodiments, image capture control module is configured to control a plurality of camera modules to captures images of a scene in parallel. Depth map generation module 410 is configured to generate a depth map corresponding to a scene, e.g., using captured images from multiple camera modules, e.g., multiple optical chains. In some embodiments, depth map generation module 410 uses triangulation techniques. In some embodiments, depth map generation module 410 processes stereo images to obtain depth information.

Corresponding image portion identification module 412 is configured to identify portions of multiple images which correspond to a same scene area, identified portions of images corresponding to the same scene area being corresponding image portions. Corresponding portion identification module 412 includes an objected detection module 414, an object comparison module 416 and a corresponding image portion object based identification module 418. Object detection module 414 is configured to detect objects in multiple images. Object comparison module 416 is configured to compare detected objects from multiple images, e.g., to find the same objects occurring in multiple images and to locate the same detected objects in multiple images, e.g., for the purposes of alignment and/or scaling. Corresponding image portion object based identification module 418 is configured to identify portions of images which correspond to the same scene area based on a comparison of objects detected in multiple images. Module 418 includes a corresponding image portion set identification module 420 configured to identify sets of corresponding image portions from the multiple captured images.

Sharpest level determination module 422 is configured to determine an image portion sharpness level for each of a plurality of portions of said multiple images. Sharpest level determination module 422 includes an image portion sharpness level determination module 424. Image portion sharpness level determination module is configured to determine a image portion sharpness level for an individual image portion of a captured image.

In some embodiments, module 424 includes an image portion depth determination module 426 configured to determine a depth to which an image portion corresponds using a generated depth map, and a depth and camera module characteristic based sharpness level determination module 428 configured to determine the image portion sharpness level based on the depth to which said image portion corresponds and the camera module used to capture the image portion. In various embodiments, at least some of the camera modules have different optical characteristics and different depths of field. In various embodiments, module 428 is configured to determine an image portion sharpness level for an image portion based on an optical transfer function of the camera module which captured the image portion. In some embodiments, the optical characteristics of a camera module is a function of at least one of a depth of field setting, the focus distance, the focal length of the camera module and the distance from the camera to objects in said image portion as indicated based on said depth map. In some embodiments, module 424 determines a sharpest level based on depth information corresponding to the image portion and camera module information, corresponding to the particular camera module which captured the image portion for which the sharpness level is being determined; exemplary camera module information includes lens information and focus setting information.

In some embodiments, module 424 includes an image portion frequency analysis module 430 configured to perform a frequency analysis on an individual image portion and a sharpness level assignment module 432 configured to assign an image portion sharpness level to an individual image portion based on the frequency content of the individual image portion to which the sharpness level is being assigned.

Composite image generation module 436 is configured to generate a composite image from multiple images, e.g., based on determined image portion sharpness levels. Composite image generation module 436 includes an image portion selection module 438 and a selected portion inclusion module 442. Image portion selection module 438 includes a sharpest image portion determination module 440. Image portion selection module 438 is configured to select from a set of corresponding image portions generated by different camera modules the image portion having the highest sharpness level. Sharpest image portion determination module 440 is configured to determine which image portion is a set of corresponding image portions has the highest sharpness, e.g., based on a comparison of determined sharpness levels corresponding to each individual image portion in a set of corresponding image portions. Selected portion inclusion module 442 is configured to include selected image portions in a composite image, one image portion from each of the sets of corresponding image portions, each selected image portion corresponding to an area of the composite image. In various embodiments, the image portions of the composite image are non-overlapping.

In some embodiments, at least some of the image portions in a set of corresponding image portions are captured at different resolutions, and said selecting performed by image portion selection module 438 is performed without regard to the resolution of the image portion in said set of corresponding image portions.

Figure 5:
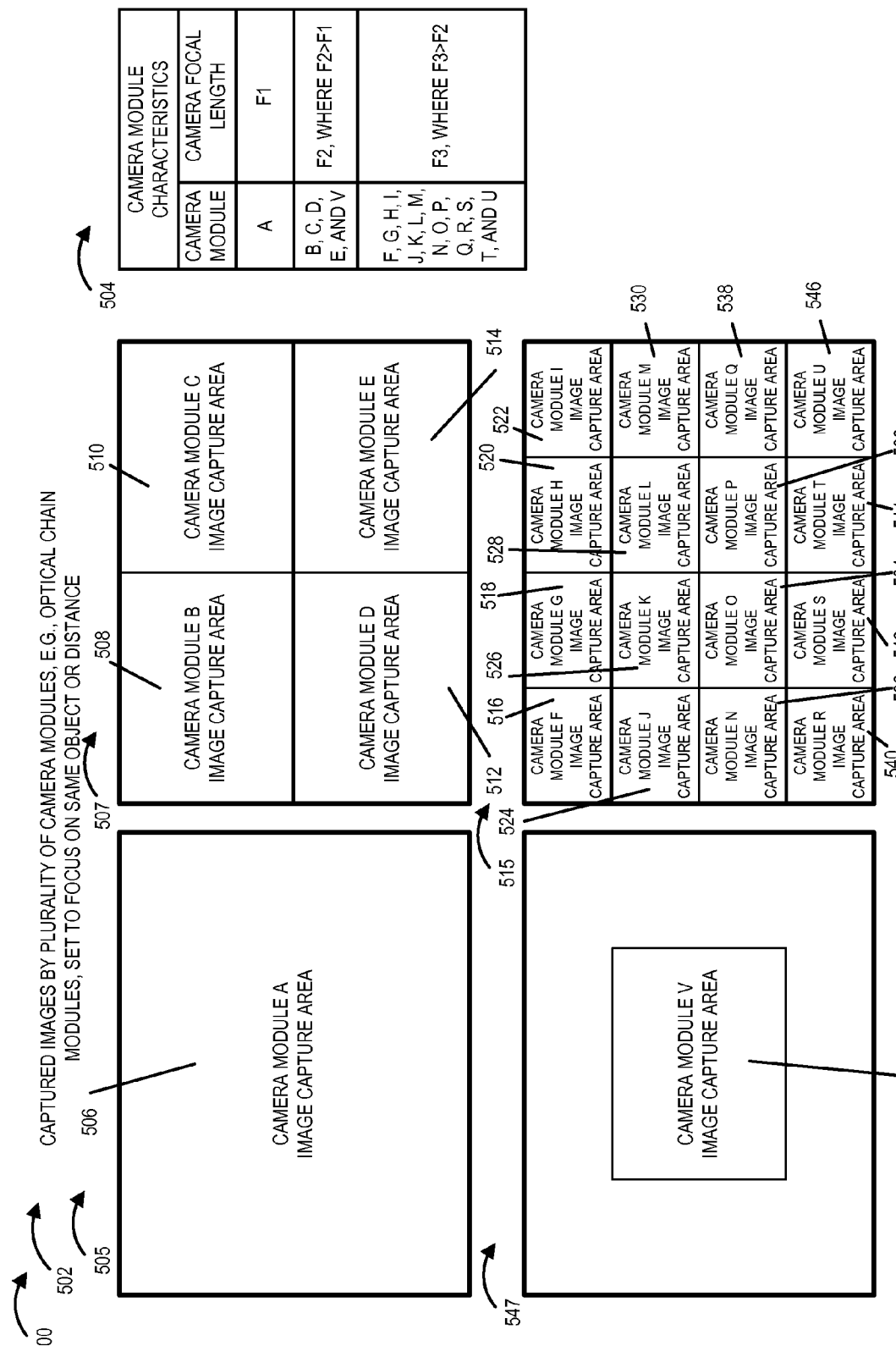
FIG. 5 is a drawing illustrating exemplary captured image areas of a scene corresponding to a plurality of camera modules in accordance with an exemplary embodiment.

FIG. 5 is a drawing 500 drawings 502 illustrating exemplary captured images by a plurality of camera modules included in an exemplary camera device and a table 504 identifying camera module characteristics. In various embodiments, the camera modules, e.g., optical chains, are set to focus on the same object or distance. Drawing 502 includes a drawing 505, a drawing 507, a drawing 515, and a drawing 547. Drawing 505, 507, 515 and 547 correspond to the same scene and may be viewed as aligned on top of one another. In this example, captured images are shown as being aligned. In various embodiments, the alignment between captured images is not known or is not precise, e.g., there may be some variation that is not known in advance, and image object detection is used to align images captured by different camera module corresponding to the same scene.

Table 504 indicates that camera module A has a focal length=F1; camera modules B, C, D, E and V have a focal length+F2, where F2>F1; and camera modules F, G, H, I, J, K, L, M, N, O, P, Q, R, S, T and U have a focal length=F3, where F3>F2. In this example, camera modules with different focal lengths have different depths of field.

Drawing 505 illustrates camera module A image capture area 506. Drawing 507 illustrates camera module B image capture area 508, camera module C image capture area 510, camera module D image capture area 512, and camera module E image capture area 514. Drawing 515 illustrates camera module F image capture area 516, camera module G image capture area 518, camera module H image capture area 520, camera module I image capture area 522, camera module J image capture area 524, camera module K image capture area 526, camera module L image capture area 528, camera module M image capture area 530 camera module N image capture area 532, camera module O image capture area 534, camera module P image capture area 536, camera module Q image capture area 538 camera module R image capture area 540, camera module S image capture area 542, camera module T image capture area 544, and camera module U image capture area 546. Drawing 547 illustrates camera module V image capture area 548.

Figure 6:
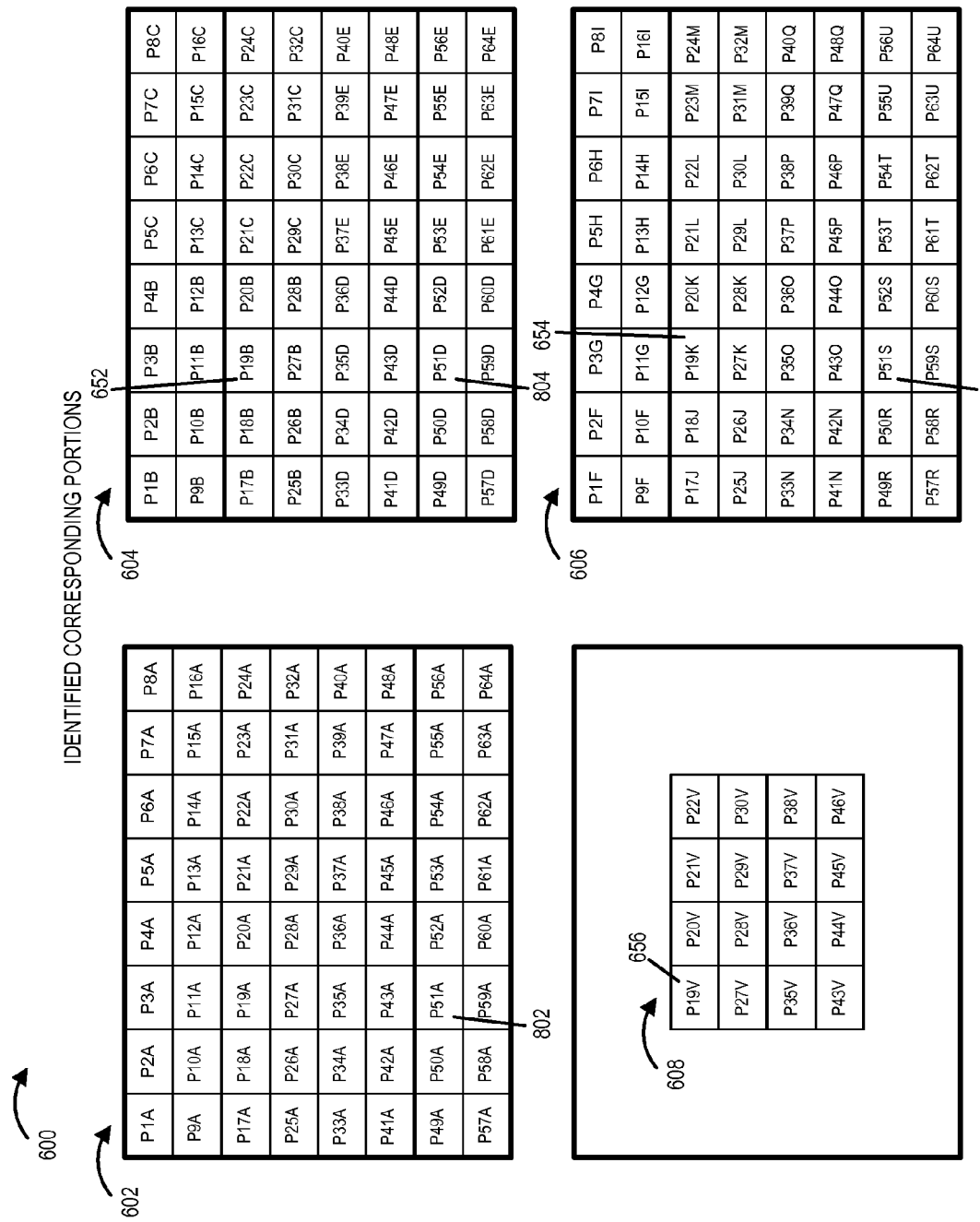
FIG. 6 illustrates exemplary identified corresponding image portion corresponding to the example of FIG. 5 in accordance with an exemplary embodiment.

FIG. 6 is a drawing 600 illustrating identified corresponding image portions for the captured images of FIG. 5. Drawing 602 illustrating exemplary image portions corresponding to the image captured by camera module A. Drawing 604 illustrating exemplary image portions corresponding to the images captured by camera modules B, C, D, and E. Drawing 606 illustrating exemplary image portions corresponding to the images captured by camera modules F, G, H, I, J, K, L, M, N, O, P, Q, R, S, T, and U. Drawing 608 illustrating exemplary image portions corresponding to the image captured by camera module V.

In this example, an individual image portion is identified by "$PN_1L_1$". A set of corresponding image portions has the same number for "$N_1$". L1 identifies the module to which the individual image portion corresponds. For example, one set of corresponding image portions is: {image portion P19A 650, image portion P19B 652, image portion P19K 654, P19V 656}. In this example there are 64 sets of corresponding image portions. In this example, each of the 64 sets of corresponding image portions includes 3 or 4 elements.

Figure 7:
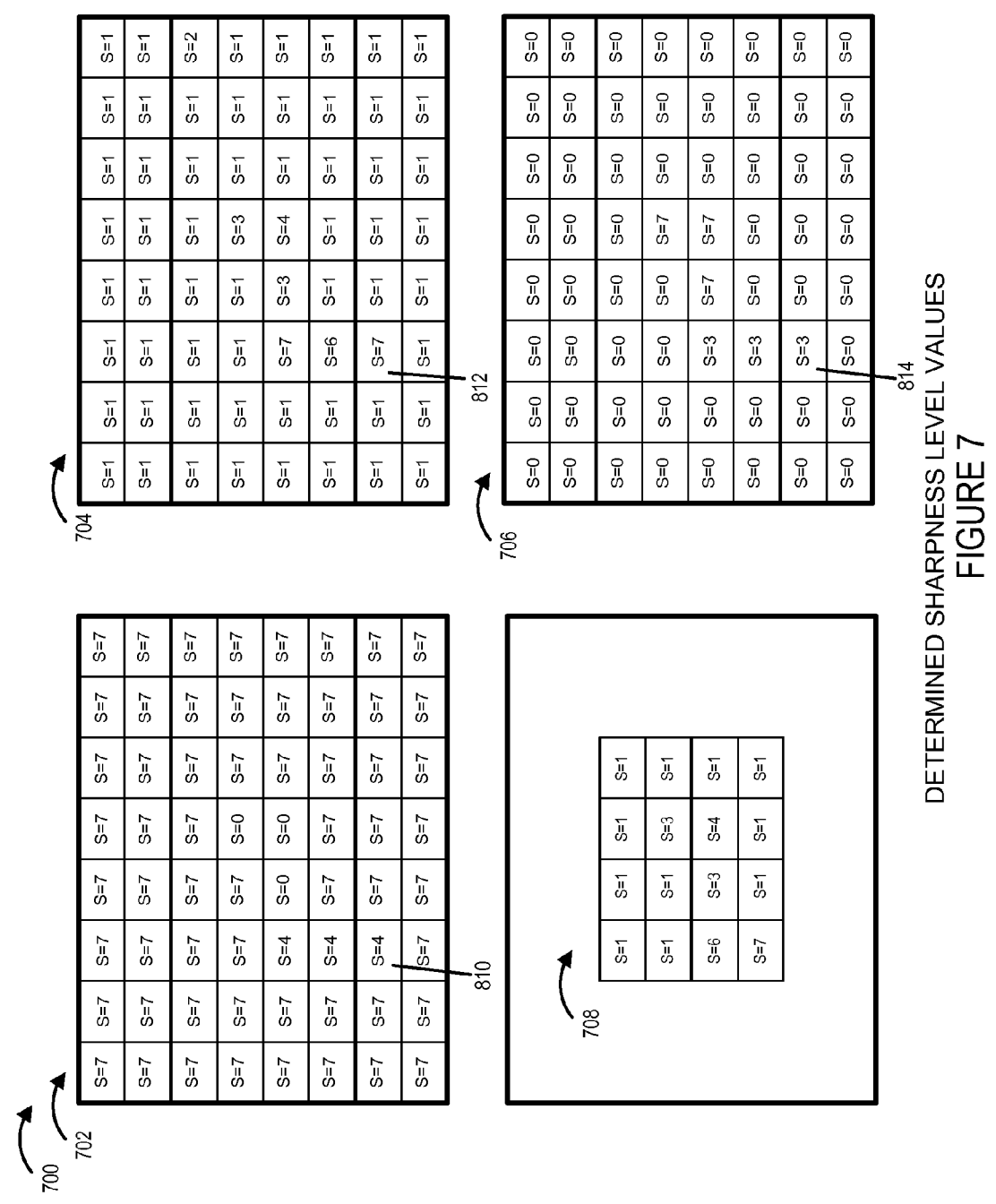

FIG. 7 is a drawing 700 illustrating determined sharpness level values for each of the individual image portions corresponding to FIG. 6. In this example, an image sharpness level is one value in the set of {0, 1, 2, 3, 4, 5, 6, 7}, where 7 represents the highest sharpness and 0 represents the lowest sharpness. Drawing 702 illustrating exemplary determined sharpness levels for the individual image portions corresponding to the image captured by camera module A. Drawing 704 illustrating exemplary determined image sharpness levels for the image portions corresponding to the images captured by camera modules B, C, D, and E. Drawing 706 illustrating exemplary determined image sharpness levels for the individual image portions corresponding to the images captured by camera modules F, G, H, I, J, K, L, M, N, O, P, Q, R, S, T, and U. Drawing 708 illustrating exemplary determined sharpness levels for the individual image portions corresponding to the image captured by camera module V.

Figure 8:
FIG. 8 illustrates an exemplary composite image of selected sharpest portions corresponding to the example of FIG. 7 in accordance with an exemplary embodiment.

FIG. 8 is a drawing 800 illustrating a composite image including selected sharpest portions of sets of corresponding image portions, one selected image portions per set of corresponding image portions. In this example, the selected portion in a set of corresponding image portions is the portion with the determined highest sharpness level. For example, consider the set of corresponding image portions {P51A 802, P51D 804, P51S 808} as shown in FIG. 6, which have determined sharpness levels {S=4 810, S=7 812, S=3 814}, respectively, as shown in FIG. 7. Since the sharpest level for image portion P51D 808 is the highest, image portion P51D 808 is included as part of generated composite image 800 of FIG. 8.

Figure 9:
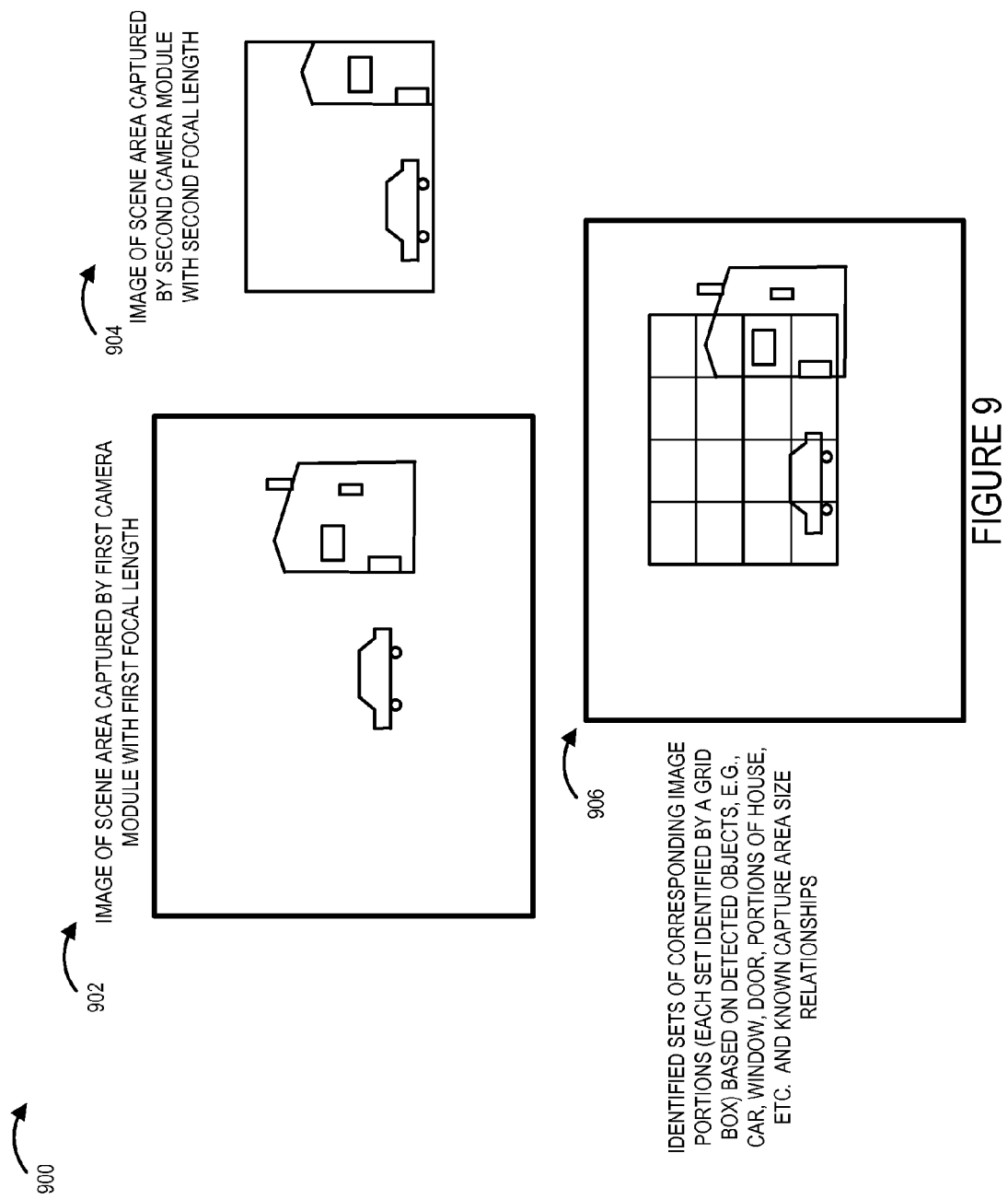
FIG. 9 illustrates an example of identifying sets of corresponding image portions corresponding to two captured images from camera modules with different focal lengths based on the comparison of detected objects in accordance with an exemplary embodiment.

FIG. 9 includes drawing 900 which illustrates an example of identifying sets of corresponding image portions corresponding to two captured images from camera modules with different focal lengths based on the comparison of detected objects in accordance with an exemplary embodiment. Drawing 900 includes drawing 902 illustrating a image of scene area captured by an exemplary first camera module with a first focal length, a drawing 904 illustrating an image of the scene area captured by an exemplary second camera module with a second focal length which is different from the first focal length. The two images 902, 904 are, e.g., captured in parallel by different camera modules of the same camera device, the different camera modules having different depths of field. Drawing 906 illustrates identified sets of corresponding image portions, e.g., set identified by a grid box, based on detected objects in the images, e.g., car, window, door, portion of house, etc., and known capture area size relationship information. Thus, in some embodiments, objects detected in multiple images are used to align and/or scale the image and overlay the images and identify sets of corresponding image portions.

FIG. 10 illustrates a camera system 1000 including a camera device 1002 and an image processing device 104 which can be used in accordance with the present invention. The camera device 1002 maybe the same or similar to the camera 300 shown in FIG. 3. The camera device 1002 is coupled to the image processing device 1004 via a communications link 1003 which maybe a wireless link, network link or wired link such as a USB cable. Image processing device 1004 maybe a personal computer or network node, such as a cloud server, capable of receiving images from the camera device 1002, processing said images, and sending one or more control signals to the camera device 1002. The image processing device 1004 includes an interface 1006 with which it can receive from, and send data and/or other information to the camera device 1002. The image processing device 1004 includes interface 1006 that is coupled via bus 1016 to a processor 1008, image processing module 1010, display 1012 and memory 1014. The various elements coupled to the bus 1016 can communicate over the bus with each other and via interface 1006 with external elements including the camera device 1002 and other network elements which can communicate with the image processing device via a network and interface 10006. The processor 1008 can and does receive and processes images form the camera device 1002. Processing can include depth map generation, camera device control and/or generation of a composite image in accordance with the steps of the method shown in FIG. 2. The memory 1014 includes images, e.g., received images and generated composite images and one or more routines 1022 which control the image processing device to implement the steps of the methods of the invention including the image processing steps shown in FIG. 2. As should be appreciated the functionally described with respect to FIG. 2 can be split between the camera device 1002 and image processing device 1004 in any of a variety of ways with the processor of the camera device 10002 performing some functions and the processor of the image processing device 1004 performing other functions. Image processing module 1010 maybe and sometimes is implemented as a dedicated image processing circuit responsible for generating the depth map and/or composite image in a hardware circuit. In some embodiments modules are implemented fully in hardware, e.g., as a circuit or combination of circuit and optical elements.

From the above it should be appreciated that the camera system implementing the method of FIG. 2 can be implemented in a single camera device, e.g., a portable handheld camera or can be implemented in a distributed manner with the camera device capturing images and various image processing operations being performed using hardware, e.g., a personal computer or network node, to perform one or more image processing operations outside the camera device.

The methods and apparatus of the present invention can be used with a wide range of camera devices and camera modules which are also sometimes referred to as optical chains. U.S. patent application Ser. No. 14/327,514 which was filed on Jul. 9, 2014 describes various camera modules and camera devices which can be used with the methods described herein and is hereby expressly incorporated by reference in its entirety.

The techniques of various embodiments may be implemented using software, hardware and/or a combination of software and hardware. Various embodiments are directed to apparatus, e.g., a camera device, an image processing device or a system. Various embodiments are also directed to methods, e.g., a method of generating combined pixel values from sets of input pixel values corresponding to an image area where each set of pixel values may be provided by a different optical chain module. Various embodiments are also directed to machine, e.g., computer, readable medium, e.g., ROM, RAM, CDs, hard discs, etc., which include machine readable instructions for controlling a machine, e.g., camera device, processor or image processing system, to implement one or more steps of one or more of the methods described in the present application.

In various embodiments apparatus described herein are implemented using one or more modules to perform the steps corresponding to one or more methods. Thus, in some embodiments various features are implemented using modules. Such modules may be implemented using software, hardware or a combination of software and hardware. Optical chain modules as should be appreciated include as least some hardware elements such as an image sensor and are therefore normally not implementable purely in software while other modules may be implemented fully in software. In some embodiments in which the modules are implemented in hardware, the modules are implemented as circuits, e.g., of a processor and/or as a combination of hardware elements such as lenses, filters and an image sensor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a camera device, an image processing device or other type of system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of generating an image, the method comprising:
   operating an image processing device including a processor to receive multiple images of a scene captured using optical chains of a camera, at least some of said optical chains having different depths of field;
   determining, by the processor, an image portion sharpness level for each of a plurality of portions of said multiple images; and
   generating, by the processor, a composite image from said multiple images based on the determined image portion sharpness levels by combining the sharpest image portions of the scene captured by different optical chains; and
   operating a memory to store the composite image.

2. The method of claim 1, wherein determining an image portion sharpness level for each of a plurality of portions of said multiple images includes determining on a per image portion basis, a numerical value which is indicative of the sharpness of the image portion to which the determined numerical value corresponds.

3. The method of claim 1, further comprising:
receiving user input identifying an object to focus on; and
focusing said optical chains based on the user identified object.

4. The method of claim 3, where a plurality of said optical chains with different depths of field are set to focus to the same distance.

5. The method of claim 1, further comprising:
generating a depth map corresponding to said scene; and
wherein determining an image portion sharpness level for each of a plurality of portions of said multiple images includes:
determining an image portion sharpness level value for each of a plurality of different portions of a first image, at least some of the different portions of the first image having different image portion sharpness level values due to different levels of sharpness of the different portions of the first image.

6. The method of claim 5, wherein determining an image portion sharpness level value for a first image portion of the first image includes:
using said generated depth map to determine a depth to which the image portion corresponds; and
determining the image portion sharpness level value based on the depth to which said image portion corresponds and the optical chain used to capture the image portion.

7. The method of claim 5, wherein at least some of said optical chains have different optical characteristics and different depths of field.

8. The method of claim 7, wherein determining an image portion sharpness level value for an image portion is based on an optical transfer function of the optical chain which captured the image portion.

9. The method of claim 7, wherein the optical characteristic of the optical chain is a function of at least one of a depth of field setting, the focus distance, the focal length of the optical chain and the distance from said camera to objects in said image portion as indicated based on said depth map.

10. The method of claim 1, further comprising:
identifying portions of multiple images which correspond to a same scene area, identified portions of images corresponding to the same scene area being corresponding image portions.

11. The method of claim 10, wherein identifying portions of images which correspond to the same scene area is based on a comparison of objects detected in said multiple images.

12. The method of claim 10,
wherein at least a first image portion of a first image and a first image portion of a second image are corresponding image portions that are captured by different optical chains that correspond to a first scene area, the first image portion being of lower resolution than the second image portion, the first image portion of the first image and the first image portion of the second image being in a first set of corresponding image portions corresponding to the first scene area; and
wherein generating a composite image includes, selecting from the first set of corresponding image portions the image portion having the highest sharpness level.

13. The method of claim 12, wherein the first image portion of the first image corresponding to the first scene area is of lower resolution than the first image portion of the second image but has a higher determined sharpness level than the first image portion of the second image;
wherein said composite image includes one image portion corresponding to each area of the composite image; and
wherein generating a composite image includes, selecting one image portion from each set of corresponding image portions, each selected image portion corresponding to an area of the composite image, said selecting one image portion from each set of corresponding image portions including selecting the first image portion of the first image corresponding to the first scene area for inclusion in the composite image rather than selecting the first image portion of the second image.

14. A camera system comprising:
a plurality of optical chains, at least some of said optical chains having different depths of field, said optical chains capturing multiple images of a scene;
a processor configured to:
determine an image portion sharpness level for each of a plurality of portions of said multiple images; and
generate a composite image from said multiple images based on the determined image portion sharpness levels by combining the sharpest image portions of the scene captured by different optical chains; and
a memory coupled to said processor for storing said composite image.

15. The camera system of claim 14, wherein at least some of the optical chains: i) have different focal lengths, ii) have the same focal length but different apertures, or iii) have the same focal length, same aperture and different sensor pixel sizes.

16. The camera system of claim 14, further comprising:
a user input device configured to receive user input identifying an object to focus on; and
a focus control device configured to focus said optical chains based on the user identified object.

17. The camera system of claim 14, wherein said processor is further configured to generate a depth map corresponding to said scene.

18. The camera system of claim 17, wherein the processor, as part of determining an image portion sharpness level for each of a plurality of portions of said multiple images:
determines, using said generated depth map, a depth to which the image portion corresponds; and
determines for an individual image portion, an image portion sharpness level based on the depth to which said image portion corresponds and the camera module used to capture the image portion.

19. The camera system of claim 14,
wherein the processor is further configured to identify portions of multiple images which correspond to a same scene area, identified portions of images corresponding to the same scene area being corresponding image portions.

20. A non-transitory machine readable medium including processor executable instructions which when executed by a processor of a camera system, control the camera system to perform the steps of:
capturing multiple images of a scene using optical chains, at least some of said optical chains having different depths of field;
determining an image portion sharpness level for each of a plurality of portions of said multiple images; and
generating a composite image from said multiple images based on the determined image portion sharpness levels by including the sharpest image portions of the scene captured by different optical chains.

* * * * *